US012227058B2

(12) United States Patent
Couture et al.

(10) Patent No.: US 12,227,058 B2
(45) Date of Patent: Feb. 18, 2025

(54) CONNECTOR FOR CONNECTING A WINDSHIELD AND AN INTRUSION BAR TO A ROLL CAGE OF AN OFF-ROAD VEHICLE

(71) Applicant: BOMBARDIER RECREATIONAL PRODUCTS INC., Valcourt (CA)

(72) Inventors: Raphael Couture, Sherbrooke (CA); Hubert Bilodeau, Orford (CA); Yanick Proulx, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 317 days.

(21) Appl. No.: 17/854,582

(22) Filed: Jun. 30, 2022

(65) Prior Publication Data
US 2024/0001739 A1 Jan. 4, 2024

(51) Int. Cl.
*B60J 1/00* (2006.01)
*B60J 1/02* (2006.01)

(52) U.S. Cl.
CPC ................ *B60J 1/006* (2013.01); *B60J 1/02* (2013.01)

(58) Field of Classification Search
CPC ......... B60R 7/081; B60R 7/043; B60R 7/005; B60R 2021/0018; B60R 2021/0074; B60R 2021/0081; B60R 2021/0083; B60R 2021/0086; B29C 37/0025; B29C 44/12; B29K 2075/00; B29K 2623/12; B29L 2031/3041; B60N 2/6009; B60N 2/5891; B60J 1/006; B60J 1/02
See application file for complete search history.

(56) References Cited

U.S. PATENT DOCUMENTS 8,875,830 B2  11/2014  Massicotte et al.

*Primary Examiner* — Paul N Dickson
*Assistant Examiner* — Sara Laghlam
(74) *Attorney, Agent, or Firm* — BCF LLP

(57) ABSTRACT

A connector for connecting a windshield and an intrusion bar to a roll cage of an off-road vehicle. The connector includes: a clamp configured to be clamped to a front leg of the roll cage, the clamp being configured to clamp part of a windshield to the front leg of the roll cage, the clamp defining at least one aperture; and at least one fastener inserted through the at least one aperture, the at least one fastener being configured to engage the intrusion bar to connect the intrusion bar to the clamp. A windshield assembly for an off-road vehicle having a roll cage is also disclosed. The windshield assembly includes a windshield, an intrusion bar and a clamp for connecting the windshield and the intrusion bar to a front leg of the roll cage.

19 Claims, 9 Drawing Sheets

CONNECTOR FOR CONNECTING A WINDSHIELD AND AN INTRUSION BAR TO A ROLL CAGE OF AN OFF-ROAD VEHICLE

FIELD OF TECHNOLOGY

The present technology relates to off-road vehicles having roll cages, and in particular to such vehicles having an intrusion bar connected to the roll cage.

BACKGROUND

Some off-road vehicles, such as side-by-side vehicles, have roll cages that surround a cockpit of the vehicle in order to protect the occupants, for example in case the vehicle rolls over. In some cases, an intrusion bar is connected to the roll cage at a windshield area thereof to prevent large objects from entering the cockpit. While this provides protection to vehicle occupants, a driver may also desire having a windshield in addition to the intrusion bar since it provides complementary protection from wind and debris (e.g., dust, insects, etc.). However, installing both the intrusion bar and the windshield on the roll cage can be difficult since both components are typically installed on the same structures of the roll cage.

Thus there is a desire for a manner in which to connect both a windshield and an intrusion bar to a roll cage of an off-road vehicle that addresses at least in part some of these drawbacks.

SUMMARY

It is an object of the present technology to ameliorate at least some of the inconveniences present in the prior art.

According to one aspect of the present technology, there is provided a connector for connecting a windshield and an intrusion bar to a roll cage of an off-road vehicle, the intrusion bar being configured to at least partly block a windshield area of the off-road vehicle, the connector comprising: a clamp configured to be clamped to a front leg of the roll cage, the clamp being configured to clamp part of a windshield to the front leg of the roll cage, the clamp defining at least one aperture; and at least one fastener inserted through the at least one aperture, the at least one fastener being configured to engage the intrusion bar to connect the intrusion bar to the clamp.

In some embodiments, the clamp defines an internal recess configured to receive part of the windshield therein.

In some embodiments, the clamp has a lateral inner end and a lateral outer end opposite the lateral inner end; and an axis of each fastener of the at least one fastener extends between the lateral inner end and the internal recess.

In some embodiments, the at least one aperture is at least one first aperture and the at least one fastener is at least one first fastener; the clamp defines at least one second aperture; the connector further comprises at least one second fastener inserted through the at least one second aperture; and an axis of each fastener of the at least one second fastener extends the lateral outer end and the internal recess.

In some embodiments, the clamp has a first portion and a second portion opposite the first portion; the first portion defines the internal recess; and in use: the first portion is disposed on an upper side of the front leg of the roll cage; and the part of the windshield received in the recess is held between the first portion and the upper side of the front leg of the roll cage.

In some embodiments, the first portion is fastened to the second portion to clamp the front leg of the roll cage therebetween by the at least one fastener.

In some embodiments, the first portion and the second portion are configured to clamp a part of the intrusion bar therebetween, the at least one fastener being insertable through the part of the intrusion bar and extending through the first and second portions of the clamp.

In some embodiments, the windshield is a first windshield; the connector is further configured to support a second windshield on the roll cage; in use, to support the second windshield on the roll cage: the first portion is disposed on a lower side of the front leg of the roll cage; the second portion is disposed on the upper side of the front leg of the roll cage; and part of the second windshield is supported by the second portion.

In some embodiments, the second windshield has an inner sealing member; and in use, the inner sealing member abuts an outer surface of the second portion.

In some embodiments, the clamp comprises a first portion and a second portion fastened to the first portion; and in use, the first portion and the second portion are configured to: be disposed on opposite sides of the front leg of the roll cage to clamp the front leg of the roll cage therebetween; hold part of the windshield between the first portion and the front leg of the roll cage; and hold an end of the intrusion bar between the first and second portions.

In some embodiments, each of the first portion and the second portion has a concave shape to at least partly wrap about part of the front leg of the roll cage.

In some embodiments, each of the first portion and the second portion is generally C-shaped.

According to another aspect of the present technology, there is provided a windshield assembly for an off-road vehicle having a roll cage, the windshield assembly comprising: a windshield; an intrusion bar extending along part of the windshield; and a clamp configured to be clamped to a front leg of the roll cage, the clamp connecting the windshield and the intrusion bar to the front leg of the roll cage.

In some embodiments, the clamp has an upper portion and a lower portion opposite the upper portion; the upper portion defines an internal recess; the upper portion is disposed on an upper side of the front leg of the roll cage; and part of the windshield is received in the recess and is held between the upper portion and the upper side of the front leg of the roll cage; and an end of the intrusion bar is held between the upper and lower portions of the clamp.

In some embodiments, the windshield assembly further comprises a fastener extending through the upper and lower portions of the clamp and the end of the intrusion bar to connect the intrusion bar to the clamp and to connect the upper and lower portions of the clamp to each other.

In some embodiments, the windshield defines an aperture; the upper portion of the clamp extends in the aperture of the windshield; and a longitudinal axis of the fastener extends through the aperture of the windshield.

In some embodiments, the fastener is a first fastener; and the windshield assembly further comprises a second fastener extending through the upper and lower portions of the clamp to connect the upper and lower portions of the clamp to each other; and a longitudinal axis of the second fastener does not extend through the windshield.

In some embodiments, the clamp defines a passage between the upper and lower portions of the clamp to receive the front leg of the of the roll cage therein; and the passage is disposed laterally between the first and second fasteners.

According to another aspect of the present technology, there is provided a windshield assembly for an off-road vehicle having a roll cage, the windshield assembly comprising: a windshield configured to be pivotably connected to the roll cage; an intrusion bar extending along part of the windshield; and a clamp configured to be clamped to a front leg of the roll cage, the clamp supporting the windshield and connecting the intrusion bar to the front leg of the roll cage.

According to another aspect of the present technology, there is provided a method for installing an intrusion bar and a windshield on a roll cage of an off-road vehicle, the windshield being one of a first windshield and a second windshield, the method comprising: for installing the first windshield and the intrusion bar: placing a first portion of a clamp on an upper side of a front leg of the roll cage; holding part of the first windshield between the first portion and the upper side of the front leg; placing a second portion of the clamp on a lower side of the front leg; fastening the first portion to the second portion to clamp the front leg and the part of the first windshield between the first and second portions; and fastening the intrusion bar to the clamp; for installing the second windshield and the intrusion bar: placing the second portion of the clamp on the upper side of the front leg; placing the first portion of the clamp on the lower side of the front leg; fastening the first portion to the second portion to clamp the front leg between the first and second portions; supporting part of the second windshield on the second portion of the clamp; and fastening the intrusion bar to the clamp.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned objects and/or aspects, but do not necessarily have all of them. It should be understood that some aspects of the present technology that have resulted from attempting to attain the above-mentioned object may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
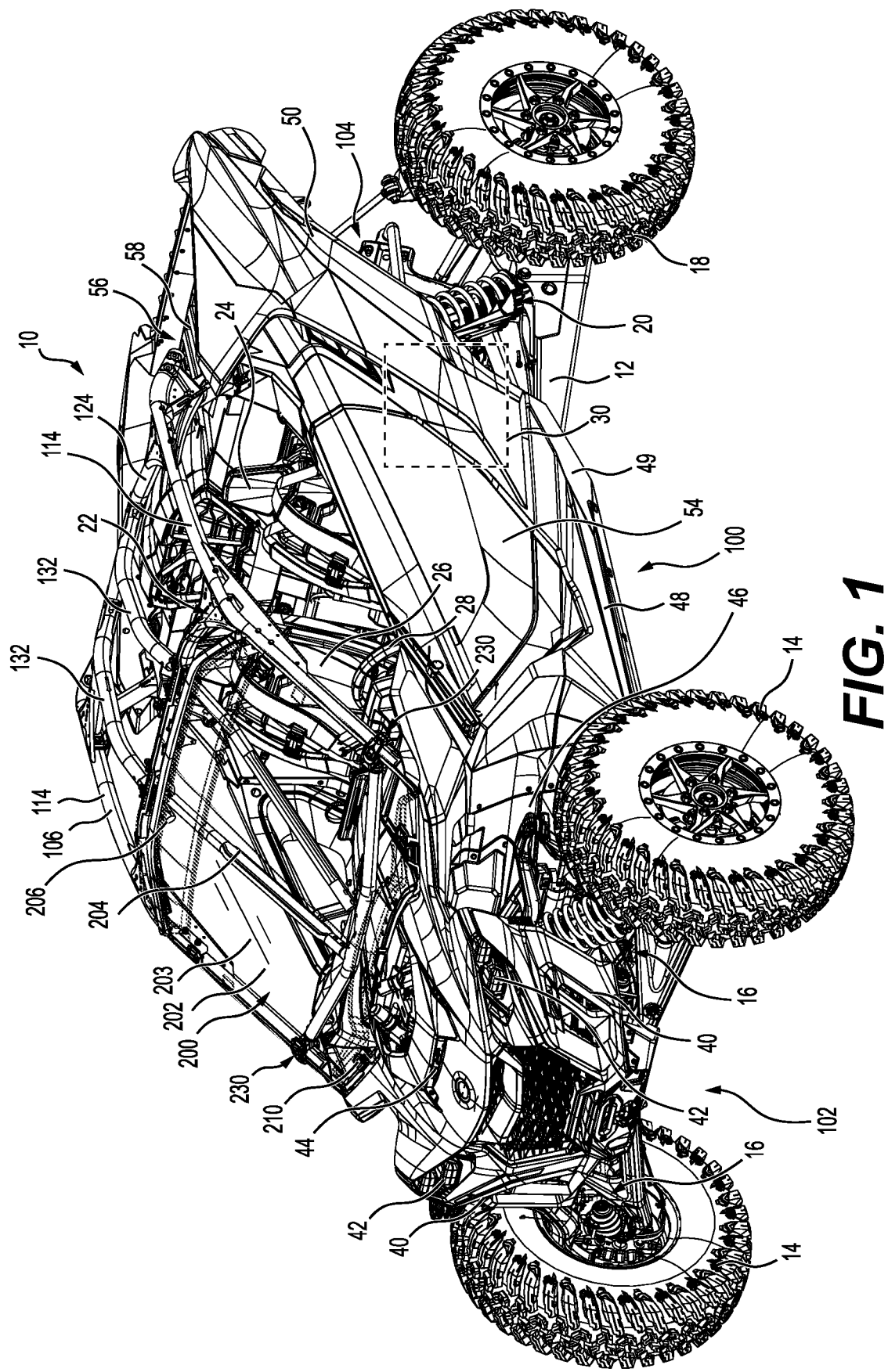
FIG. 1 is a perspective view taken from a top, front, left side of an off-road vehicle according to an embodiment of the present technology.

The present technology will be described with respect to a four-wheel off-road vehicle 10 having two side-by-side seats and a steering wheel. However, it is contemplated that some aspects of the present technology may apply to other types of vehicles such as, but not limited to, off-road vehicles having more or less than four wheels.

The general features of the off-road vehicle 10 will be described with respect to FIG. 1. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A user-operated steering input device 28 is disposed in front of the driver seat 24. In this implementation, the user-operated steering input device 28 is a steering wheel 28. The steering wheel 28 is used to turn the front wheels 14 to steer the vehicle 10. Various displays and gauges (not shown) are disposed above the steering wheel 28 to provide information to the driver regarding the operating conditions of the vehicle 10. Examples of displays and gauges include, but are not limited to, a speedometer, a tachometer, a fuel gauge, a transmission position display, and an oil temperature gauge.

An engine 30 (shown schematically in FIG. 1) is connected to the frame 12 in a rear portion of the vehicle 10. The engine 30 is connected to a continuously variable transmission (CVT) (not shown) disposed on a left side of the engine 30. The CVT is operatively connected to a transaxle (not shown) to transmit torque from the engine 30 to the transaxle. The transaxle is disposed behind the engine 30. The transaxle is operatively connected to the front and rear wheels 14, 18 to propel the vehicle 10. A fuel tank (not shown) is suspended from the frame 12 in front of the driver seat 26. The fuel tank is disposed above the floor of the cockpit area 22 to the right of a longitudinal centerplane 19 (shown in FIG. 4) of the vehicle 10.

The vehicle 10 has a plurality of body panels that are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 45 through which tops of the front suspension assemblies 16 protrude. Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. Each lower panel 48 has a front end disposed under the bottom portion of its corresponding front fender 46 and extends rearward therefrom. A generally L-shaped panel 49 is disposed behind the rear end of each lower panel 48. Generally L-shaped rear fenders 50 extend upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights of the vehicle 10. It is contemplated that the brake lights 64 could be replaced with reflectors or that reflectors could be provided in addition to the brake lights 64.

On each side of the vehicle 10, the front fender 46, the lower panel 48, the L-shaped panel 49 and the rear fender 50 define a passage through which a driver (or passenger depending on the side of the vehicle 10) can enter or exit the vehicle 10. Each side of the vehicle 10 is provided with a door 54 that selectively closes an upper portion of the corresponding passage. Each door 54 is hinged at a rear thereof to its corresponding rear fender 50 and associated portion of the frame 12 and is selectively connected at a front thereof to its corresponding front fender 46 via a releasable latch (not shown).

The rear fenders 50 define a cargo space 56 therebetween behind the seats 24, 26. The cargo space 56 has a floor 58 extending horizontally between the rear fenders 50. The floor 58 has a plurality of apertures such that the floor 58 can act as an attachments base to receive anchors such as those described in U.S. Pat. No. 8,875,830, issued Nov. 4, 2014, the entirety of which is incorporated herein by reference, in order to secure various items in the cargo space 56. It is contemplated that the floor 58 could be replaced by a cargo box that can be tilted in order to dump its content. A separation panel extends laterally and is disposed longitudinally between the seats 24, 26 and the floor 58. As a result, the separation panel separates the cockpit area 22 from the cargo area 56.

The frame 12 of the vehicle 10 has a central portion 100, a front portion 102 and a rear portion 104. As their names suggest, the front portion 102 is disposed in front of the central portion 100 and the rear portion 104 is disposed behind the central portion 100. The central portion 100 defines the cockpit area 22 in which the seats 24, 26 are disposed. The central portion 100 also includes a roll cage 106 which will be described in more detail below. The front suspension assemblies 16 are connected to the central and front portions 100, 102 of the frame 12. The engine 30, the CVT and the transaxle are supported by the rear portion 104 of the frame 12. The rear suspension assemblies 20 are connected to the central and rear portions 100, 104 of the frame 12.

The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets could be cast or otherwise formed as a single component.

Figure 2:
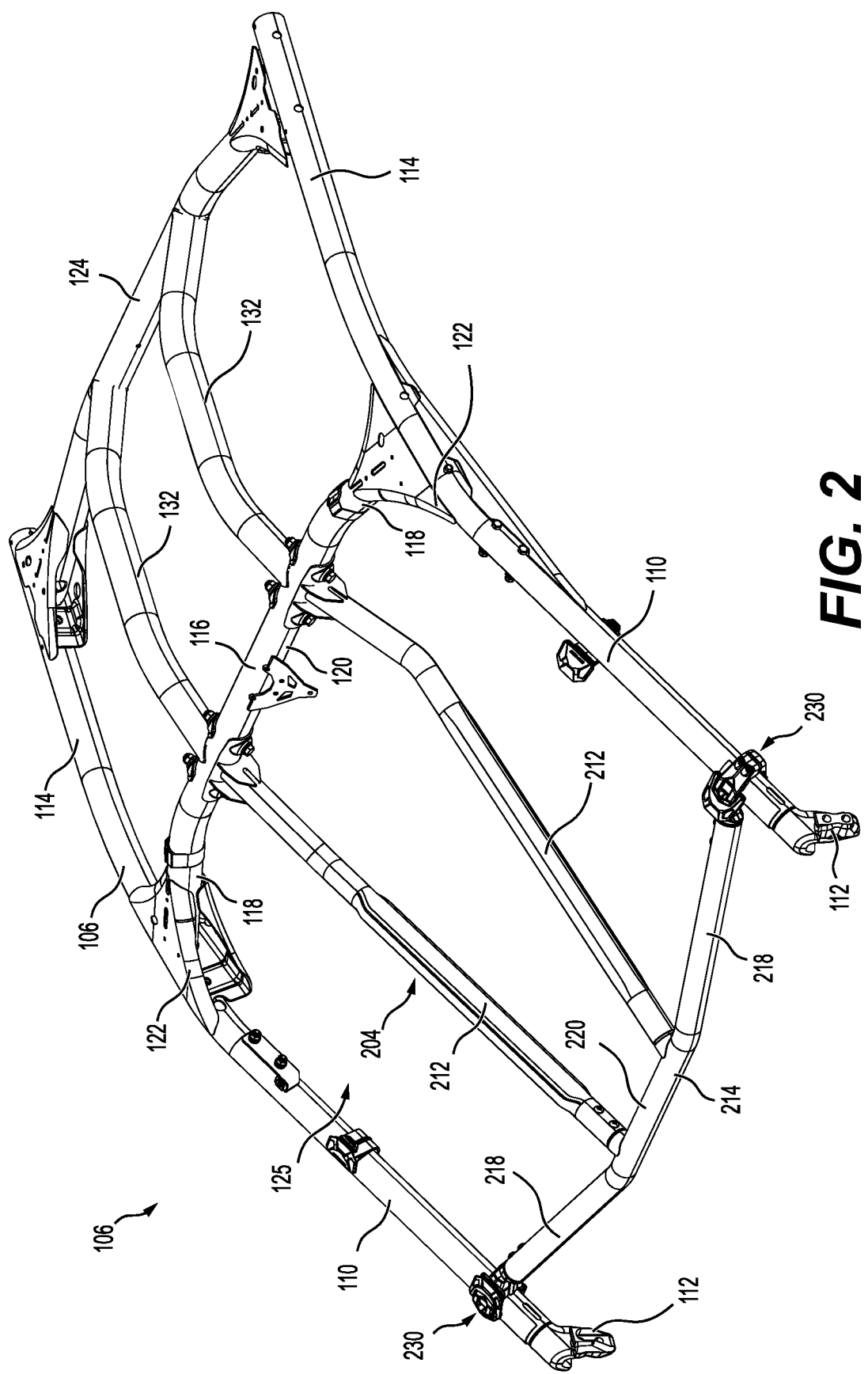
FIG. 2 is a perspective view taken from a top, front, left side of part of a roll cage, an intrusion bar and left and right connectors of the vehicle of FIG. 1.

The roll cage 106 is connected at its front to the front portion 102 of the frame 12 and at its rear to the rear portion 104 of the frame 12. With reference to FIG. 2, the roll cage 106 has a left front leg 110 and a right front leg 110 which are mirror images of each other about the longitudinal centerplane 19 of the vehicle 10. The front legs 110 are connected to respective left and right brackets (not shown) of the frame 12 and extend upward and rearward therefrom. In particular, each of the front legs 110 has a front connecting end 112 that connects to a respective one of the left and right brackets of the frame 12. At their rear ends, the left and right front legs 110 are respectively connected to or integrally made with left and right upper members 114 that define a roof portion of the roll cage 106. Notably, the upper members 114 are disposed vertically higher than the front legs 110. A front cross-member 116 is connected to and extends between the front legs 110. The cross-member 116 has two angled portions 118 and a lateral portion 120 disposed between the angled portions 118. The angled portions 118 of the cross-member 116 extend upward, rearward and laterally inward from the front legs 110. Reinforcing brackets 122 connect the angled portions 118 to the front legs 116 and to the upper members 114. Together, the front legs 110 and the front cross-member 116 define a windshield area 125 of the roll cage 106 that is disposed forward of the driver and passenger seats 24, 26.

A rear cross-member 124 is connected to and extends between the upper members 114. The cross-member 124 is disposed rearward of the cross-member 116. The cross-member 124 has two angled portions and a lateral portion disposed between the angled portions. The angled portions of the cross-member 124 extend rearward and laterally inward from the upper members 114. As shown in FIG. 2, left and right frame members 132 are connected between the cross-members 116, 124. Notably, the left and right frame members 132 extend longitudinally between the cross-members 116, 124 are disposed laterally between the left and right upper members 114. The frame members 132 extend over the central portion of the cockpit area 22. In this embodiment, the frame members 132 are arched and are vertically higher than the top of the upper members 124.

Figure 3:
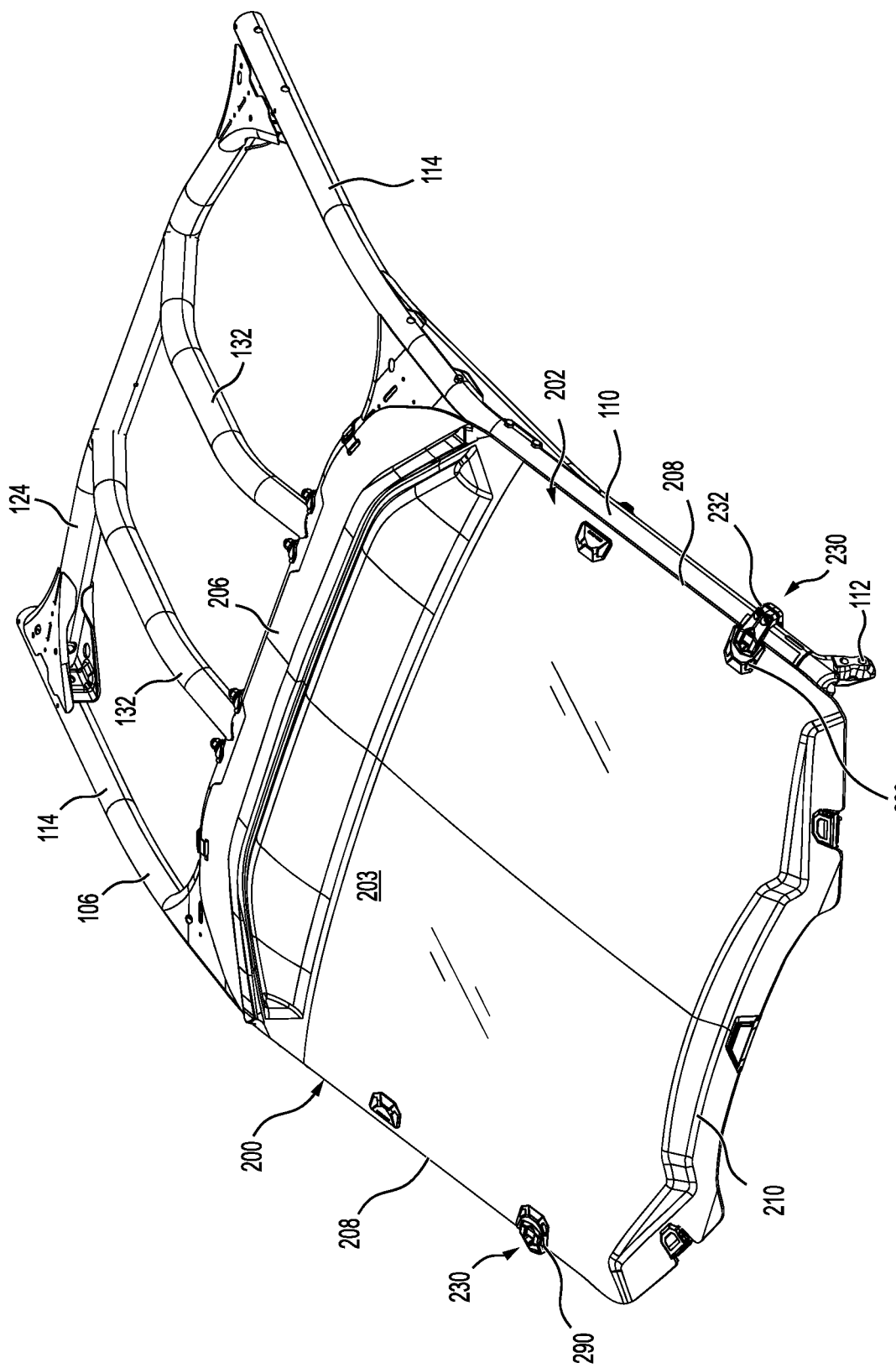
FIG. 3 is a perspective view taken from a top, front, left side of the assembly of FIG. 2 and a windshield connected to the roll cage via the left and right connectors.

As shown in FIG. 1, a windshield assembly 200 provides protection at the windshield area 125 defined by the roll cage 106. Notably, the windshield assembly 200 includes a windshield 202 (shown in transparency in FIG. 1) that provides protection from wind and small debris (e.g., dust, insects, etc.), and an intrusion bar 204 that blocks part of the windshield area 125 in order to provide protection from large debris that can be encountered in off-road conditions. The windshield 202 includes a pane of transparent material 203, namely glass in this embodiment. It is contemplated that the windshield 200 could be made from other materials, such as polycarbonate for example. As shown in FIG. 3, at its upper end, the windshield 202 has an upper connector 206 that connects the windshield 202 to the cross-member 116. At its lower end, the windshield 202 has a lower connector 210 that connects the windshield 202 to a front portion of the vehicle 10. The windshield 202 has left and right lateral ends 208 (FIG. 3) defining a width of the windshield 202 therebetween.

Figure 4:
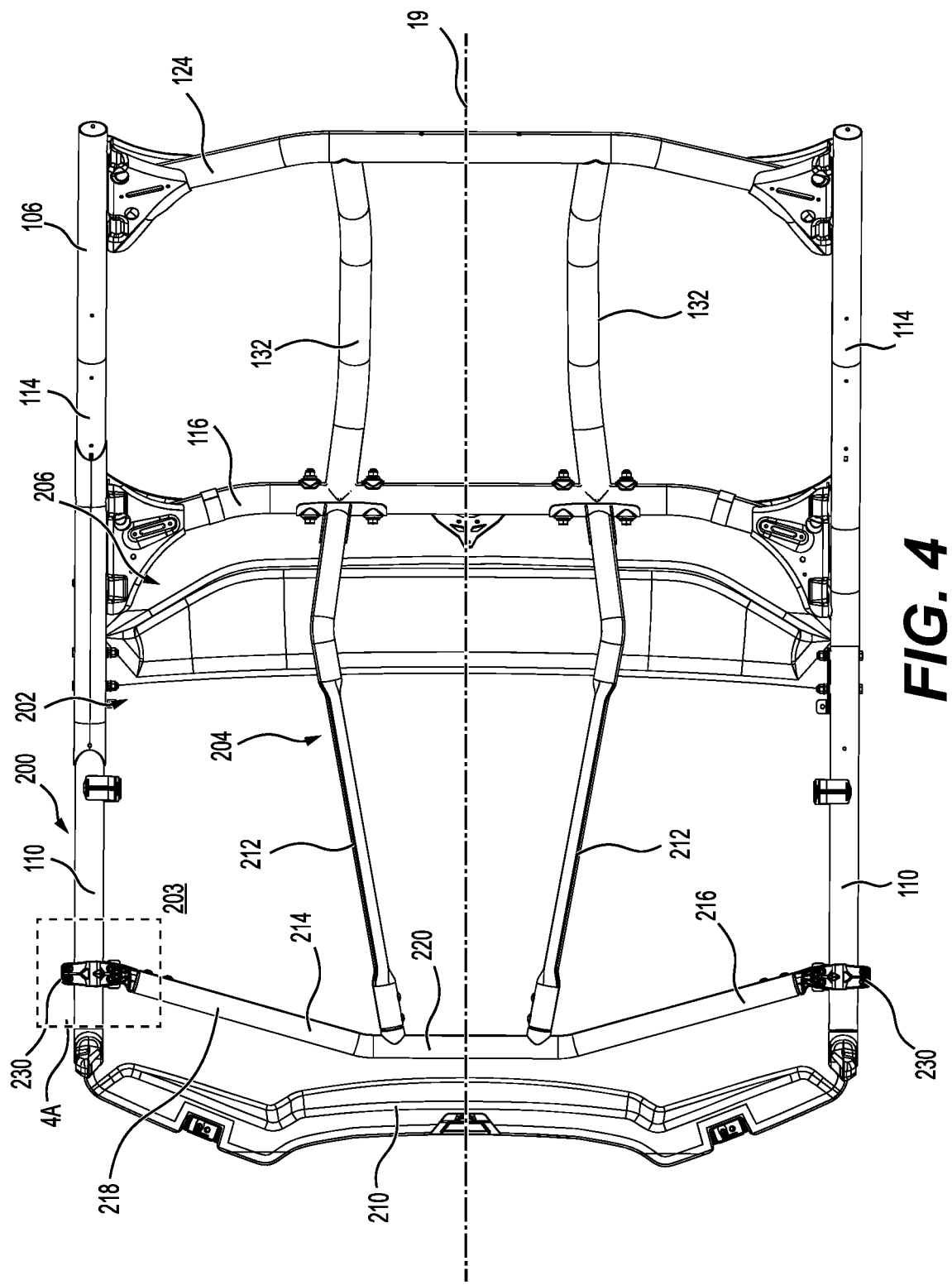
FIG. 4 is bottom plan view of the assembly of FIG. 3.

As shown in FIG. 1, in this embodiment, the intrusion bar 204 extends along part of the windshield 202. Notably, the pane 203 of the windshield 202 extends over the intrusion bar 204 (i.e., the intrusion bar 204 is positioned under the windshield 202). With reference to FIG. 2, the intrusion bar 204 has left and right longitudinal members 212 that extend downward and forward from the cross-member 116. The left and right longitudinal members 212 are disposed on opposite sides of the longitudinal centerplane 19 of the vehicle 10. The rear ends of the longitudinal members 212 are fastened to the cross-member 116. The front ends of the longitudinal members 212 are fastened to a lower cross-member 214 of the intrusion bar 204. The lower cross-member 214 is connected between the left and right front legs 110 of the roll cage 106. The lower cross-member 214 is disposed vertically lower than the cross-member 116. As best shown in FIGS. 2 and 4, the lower-cross member 214 has left and right angled portions 218 and a central portion 220 extending therebetween. Each of the angled portions 218 extends upwardly and laterally outwardly from the central portion 220.

As shown in FIGS. 3 and 4, the windshield assembly 200 also includes left and right connectors 230 that connect the windshield 200 and the intrusion bar 204 to the left and right front legs 110 respectively. Notably, the connectors 230 allow the simultaneous connection of both the windshield 202 and the intrusion bar 204 to the roll cage 106.

The connectors 230 will now be described in detail with reference to FIGS. 4A to 6. In this embodiment, the left and right connectors 230 are mirror images of each other about the longitudinal centerplane 19, and therefore only the left connector 230 will be described in detail herein in relation to the left front leg 110. It is to be understood that the same description applies to the right connector 230 in relation to the right front leg 110.

Figure 5:
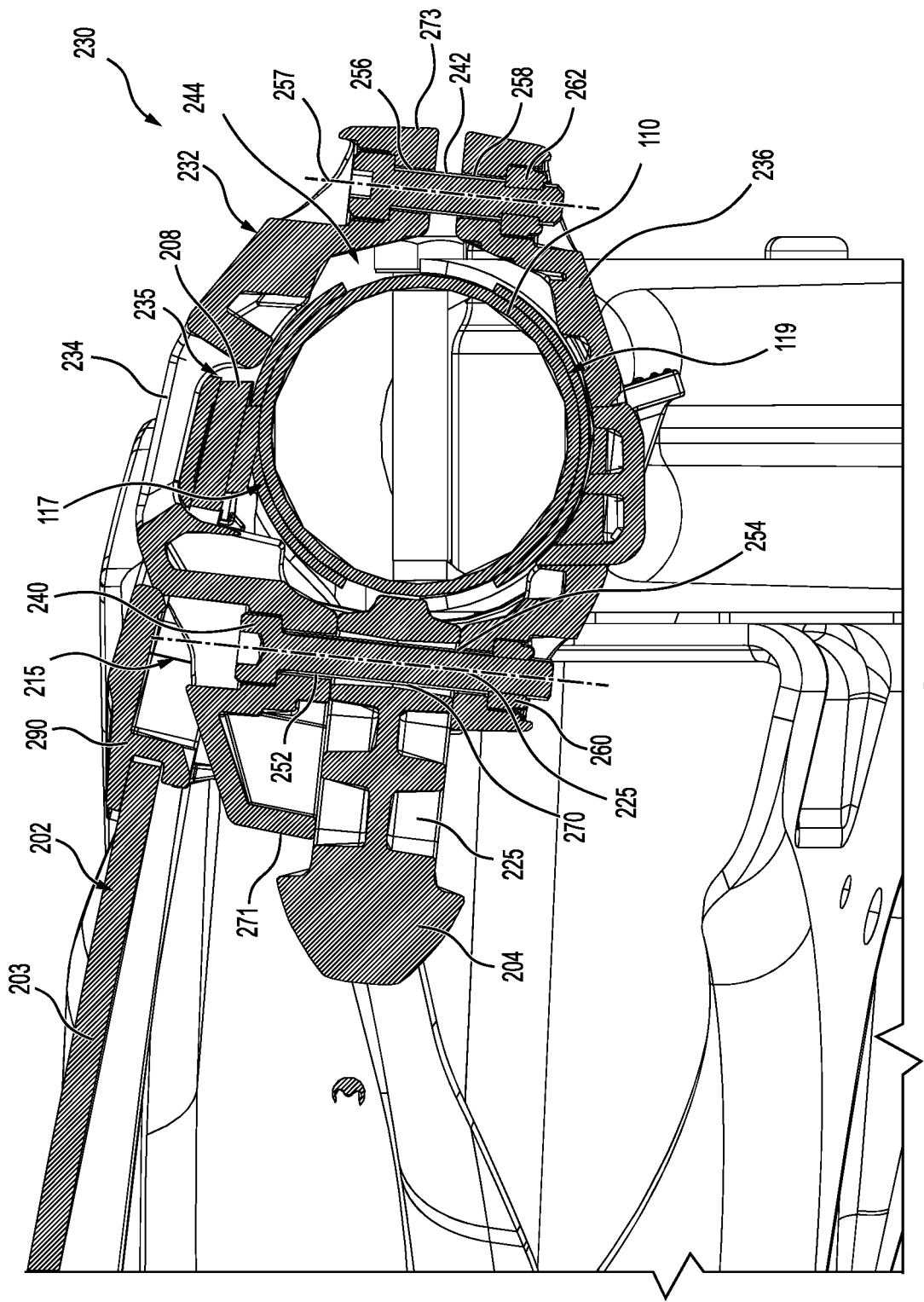
FIG. 5 is a cross-sectional view taken along line 5-5 in FIG. 4A.
Figure 6:
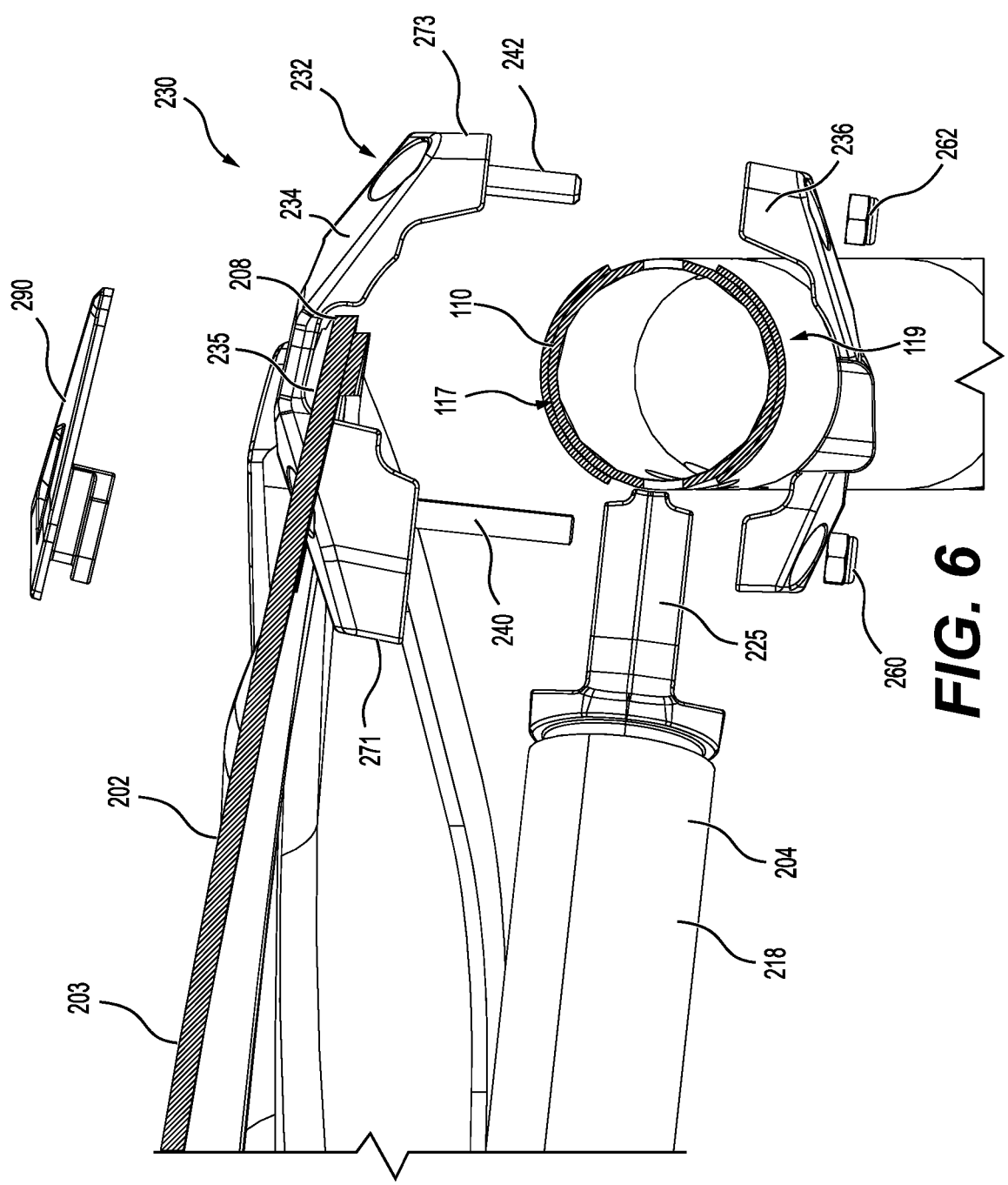
FIG. 6 is an exploded view of the left connector, and parts of the windshield and intrusion bar.

With reference to FIGS. 5 and 6, the connector 230 includes a clamp 232 that is clamped about the front leg 110 of the roll cage 106. As will be explained in more detail below, the clamp 232 clamps part of the windshield 202 to the front leg 110 and is also simultaneously fastened to the intrusion bar 204. In this embodiment, the clamp 232 includes a first portion 234 and a second portion 236 opposite the first portion 234. The first and second portions 234, 236 define a passage 244 therebetween to receive the front leg 110 therein. Notably, in this example, the first portion 234 is disposed on an upper side 117 of the front leg 110 while the second portion 236 is disposed on a lower side 119 of the front leg 110. As such, the first and second portions 234, 236 may in some cases be referred to as an upper portion 234 and a lower portion 236. Each of the first and second portions 234, 236 has a concave shape to partly wrap about the front leg 110. For instance, in this embodiment, each of the first and second portions 234, 236 is generally C-shaped. As shown in FIG. 5, the first portion 234 of the clamp 232 defines an internal recess 235 that receives a part of the windshield 202 therein, including part of the corresponding lateral end 208 of the windshield 202. In particular, the part of the windshield 202 that is received in the internal recess 235 is held between the first portion 234 and the upper side 117 of the front leg 110. The clamp 232 retains the part of the windshield 202 by extending in an aperture 215 (FIG. 5) defined by the windshield 202, namely by the pane 203. More specifically, the first portion 234 of the clamp 232 extends in the windshield aperture 215.

Figure 4A:
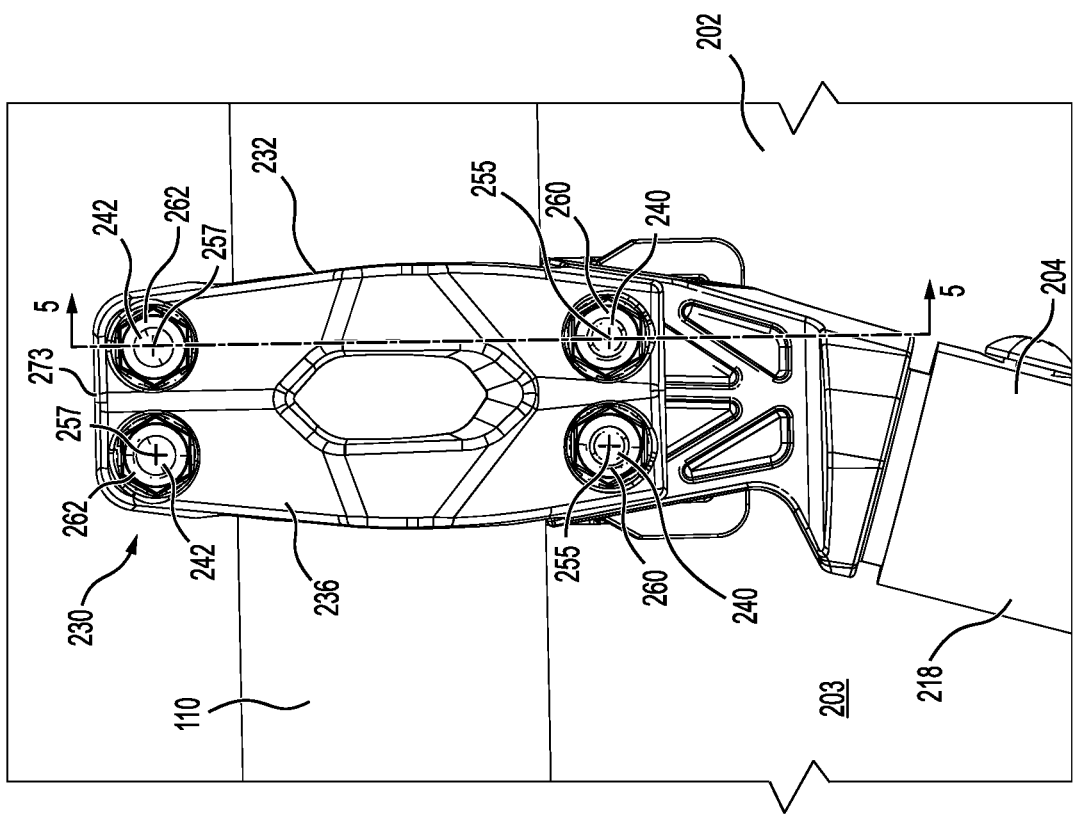
FIG. 4A is a detailed view of part of FIG. 4 designated by section 4A in FIG. 4.

As best shown in FIGS. 4A, 5 and 6, in this embodiment, the first and second portions 234, 236 are fastened to each other by a plurality of fasteners, including two inner lateral fasteners 240 and two outer lateral fasteners 242, in order to clamp the front leg 110 between the first and second portions 234, 236. The inner lateral fasteners 240 are disposed closer to the longitudinal centerplane 19 than the outer lateral fasteners 242. Notably, the passage 244 within which the front leg 110 is received is disposed laterally between the inner and outer lateral fasteners 240, 242. In this embodiment, the inner and outer lateral fasteners 240, 242 are bolts. It is contemplated that the inner and outer lateral fasteners 240, 242 could be different mechanical fasteners in other embodiments.

With reference to FIG. 5, the clamp 232 defines apertures for receiving the inner and outer lateral fasteners 240, 242. More specifically, the first portion 234 of the clamp 232 defines two apertures 252 (one of which is shown in FIG. 5) and the second portion 236 of the clamp 232 defines two apertures 254 (one of which is shown in FIG. 5) that are aligned with each other (i.e., coaxial). The inner lateral fasteners 240 are inserted through the apertures 252, 254. In this embodiment, a receiving fastener 260 (e.g., a nut) is received in a recess defined by the second portion 236 and engages a corresponding inner lateral fastener 240 to secure the first and second portions 234, 236 together.

Similarly, the first portion 234 defines two apertures 256 (one of which is shown in FIG. 5) and the second portion 236 defines two apertures 258 (one of which is shown in FIG. 5) that are aligned with each other, and the outer lateral fasteners 242 are inserted through the apertures 256, 258. In this embodiment, a receiving fastener 262 (e.g., a nut) is received in a recess defined by the second portion 236 and engages a corresponding outer lateral fastener 242 to secure the first and second portions 234, 236 together.

In this embodiment, the inner lateral fasteners 240 fasten the intrusion bar 204 to the clamp 232. Notably, the inner lateral fasteners 240 engage a left end portion 225 of the lower cross-member 214 of the intrusion bar 204 to connect the intrusion bar 204 to the clamp 232. More specifically, the end portion 225 of the intrusion bar 204 is clamped between the first and second portions 234, 236 and an aperture 270 (FIG. 5) defined by the end portion 225 is aligned to be coaxial with the apertures 252, 254 of the first and second portions 234, 236. The inner lateral fasteners 240 are then inserted within the apertures 252, 254 and the aperture 270. As such, the outer lateral end of the lower cross-member 214 of the intrusion bar 204 is held between the first and second portions 234, 236 of the clamp 232.

Since the inner lateral fasteners 240 extend through the end portion 225 of the intrusion bar 204 whereas the outer lateral fasteners 242 do not, the inner lateral fasteners 240 are longer than the outer lateral fasteners 242. Moreover, as can be seen in FIG. 5, the inner lateral fasteners 240 are positioned such that a longitudinal axis 255 of each of the inner lateral fasteners 240 extends through the aperture 215 of the windshield 202. In addition, the longitudinal axes 255 of the inner lateral fasteners 240 extend between a lateral inner end 271 of the clamp 232 (a lateral end of the clamp 232 closest to the longitudinal centerplane 19) and the internal recess 235 of the first portion 234. Conversely, a longitudinal axis 257 of each of the outer lateral fasteners 242 extends between a lateral outer end 273 of the clamp 232 (opposite the lateral inner end 271) and the internal recess 235 of the first portion 234. The longitudinal axes 257 of the outer lateral fasteners 242 do not extend through the pane 203 of the windshield 202.

As shown in FIGS. 3, 4 and 5, in this embodiment, caps 290 are engaged with the windshield 202 at each windshield aperture 215 to cover respective edge portions of the pane 203 that define the apertures 215. Notably, the caps 290 can provide a more aesthetic look to the windshield assembly 200.

As will be understood from the above, the connectors 230 provide an easy manner in which the roll cage 106 can be outfitted with both the intrusion bar 204 and the windshield 202. Moreover, the connectors 230 are relatively compact and easy to use thus facilitating their implementation.

Figure 7:
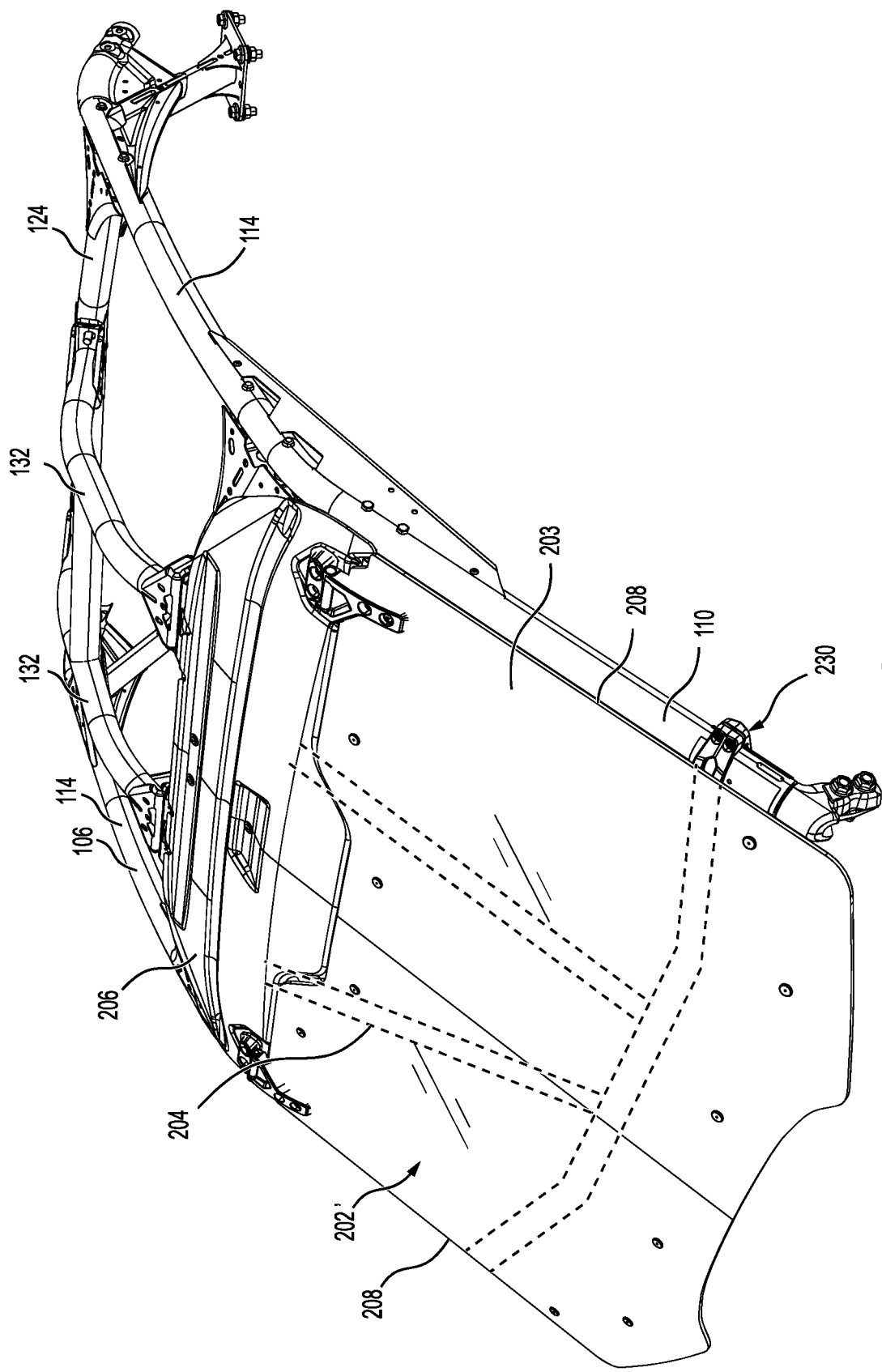
FIG. 7 is a perspective view taken from a top, front, left side of part of the roll cage, the intrusion bar and a flip-up windshield being supported on the roll cage via the left and right connectors.

Furthermore, in this embodiment, the connectors 230 can also be used when installing a different type of windshield on the roll cage 106. In particular, with reference to FIG. 7, it may be desirable to install a different windshield 202' on the roll cage 106 together with the intrusion bar 204 (illustrated schematically in FIG. 7). The windshield 202' differs from the previously-described windshield 202 in that it is a "flip up" windshield that is pivotably connected to the roll cage 106, namely to the front cross-member 116 thereof. Apart from that, unless mentioned otherwise, the windshield 202' is similar to the windshield 202 described above and therefore the corresponding parts of the windshield 202' have been identified in the drawings with the same reference numerals used to describe the windshield 202. In this case, since the windshield 202' is selectively flipped up, the connectors 230 do not clamp the windshield 202' to the front legs 110 of the roll cage 106, but instead support the windshield 202' on the front legs 110 when the windshield 202' is in a lowered position (i.e., pivoted down), thus allowing the windshield 202' to be flipped up.

Figure 8:
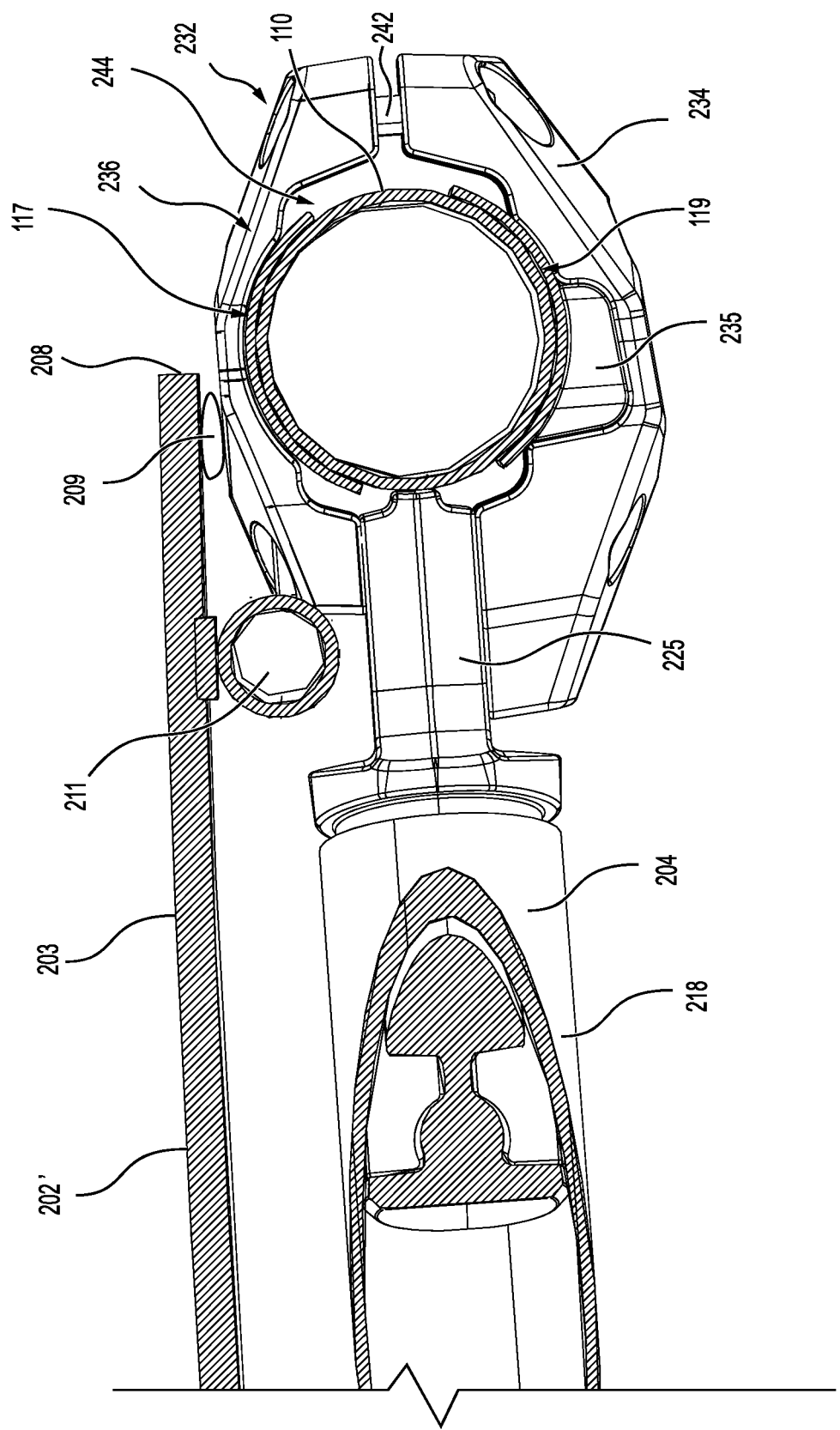
FIG. 8 is a cross-sectional view of the assembly of FIG. 7 taken across a left front leg of the roll cage and showing the left connector connected to the left front leg and supporting the flip-up windshield.

In order to accommodate the flip-up windshield 202' on the roll cage 106, the connectors 230 are mounted differently to the respective front legs 110. More specifically, to support the windshield 202' on the roll cage 106, the first portion 234 of each clamp 232 is disposed on the lower side 119 of the corresponding front leg 110, while the second portion 236 of the clamp 232 is disposed on the upper side 117 of the corresponding front leg 110. In other words, the positions of the first and second portions 234, 236 of the clamps 232 are interchanged relative to that described above for connecting the windshield 202. As such, when the connectors 230 are used in conjunction with the windshield 202', the first and second portions 234, 236 thereof could be referred to as a lower portion 234 and an upper portion 236. As shown in FIG. 8, in this case, the internal recess 235 of the first portion 234 of each clamp 232 does not receive part of the windshield 202' therein as the clamp 232 does not clamp the windshield 202' to the corresponding front leg 110. The internal recess 235 thus remains empty, or, in some cases, the internal recess 235 of each clamp 232 could be filled with a plug made of polymeric material (e.g., rubber) for aesthetic purposes. Instead of clamping part of the windshield 202' to the corresponding front leg 110, the windshield 202' is partially rested on the second portion 236 of each clamp 232 such that the second portion 236 supports part of the windshield 202', including for example the corresponding lateral end 208 of the windshield 202'.

As shown in FIG. 8, in this example, the flip-up windshield 202' has a metallic windshield support structure 207 and left and right inner sealing members 209 (one of which is shown in FIG. 8) disposed on an inner side of the windshield 202'. The inner sealing members 209 extend near the respective lateral ends 208 of the windshield 202'. In the lowered position of the windshield 202', the inner sealing members 209 abut the front legs 110 and the clamps 232. As such, in the lowered position of the windshield 202', the windshield 202' is supported by the clamps 232 and the inner sealing members 209 form respective seals with the front legs 110 (along parts of the front legs 110 above and below the connectors 230) and also form seals along respective portions of the inner sealing members 209 abutting the outer surfaces of the clamps 232. In particular, as will be appreciated, for each clamp 232, a thickness of the second portion 236 (i.e., a distance between outer and inner surfaces of the second portion 236) along a lateral span thereof that overlaps the clamped front leg 110 is smaller than a thickness of the first portion 234 (i.e., a distance between outer and inner surfaces of the first portion 234) along a lateral span thereof that overlaps the clamped front leg 110. This reduced thickness of the second portion 236 relative to the first portion 234 allows the corresponding inner sealing member 209 to form a seal with the front leg 110 despite the contact with the clamp 232. The inner sealing member 209 is simply slightly more compressed at its interface with the clamp 232 than along its interface with the front leg 110. In this example, each of the inner sealing members 209 has a cross-sectional profile that is generally square in an undeformed state of the inner sealing member 209. Moreover, in this example, the inner sealing members 209 are made of foam and/or rubber. Despite the positions of the first and second portions 234, 236 of the clamps 232 being inverted relative to that described above, the intrusion bar 204 is fastened to the clamps 232 in the same manner, namely clamping the end portions 225 of the intrusion bar 204 between the first and second portions 234, 236 of the clamps 232.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A connector for connecting a windshield and an intrusion bar to a roll cage of an off-road vehicle, the intrusion bar being configured to at least partly block a windshield area of the off-road vehicle, the connector comprising:
    a clamp configured to be clamped to a front leg of the roll cage,
    the clamp being configured to clamp part of a windshield to the front leg of the roll cage,
    the clamp defining at least one aperture; and
    at least one fastener inserted through the at least one aperture, the at least one fastener being configured to engage the intrusion bar to connect the intrusion bar to the clamp.

2. The connector of claim 1, wherein the clamp defines an internal recess configured to receive part of the windshield therein.

3. The connector of claim 2, wherein:
    the clamp has a lateral inner end and a lateral outer end opposite the lateral inner end; and
    an axis of each fastener of the at least one fastener extends between the lateral inner end and the internal recess.

4. The connector of claim 3, wherein:
    the at least one aperture is at least one first aperture and the at least one fastener is at least one first fastener;
    the clamp defines at least one second aperture;
    the connector further comprises at least one second fastener inserted through the at least one second aperture; and an axis of each fastener of the at least one second fastener extends between the lateral outer end and the internal recess.

5. The connector of claim 2, wherein:
the clamp has a first portion and a second portion opposite the first portion;
the first portion defines the internal recess; and
in use:
the first portion is disposed on an upper side of the front leg of the roll cage; and
the part of the windshield received in the recess is held between the first portion and the upper side of the front leg of the roll cage.

6. The connector of claim 5, wherein the first portion is fastened to the second portion to clamp the front leg of the roll cage therebetween by the at least one fastener.

7. The connector of claim 5, wherein the first portion and the second portion are configured to clamp a part of the intrusion bar therebetween, the at least one fastener being insertable through the part of the intrusion bar and extending through the first and second portions of the clamp.

8. The connector of claim 5, wherein:
the windshield is a first windshield;
the connector is further configured to support a second windshield on the roll cage;
in use, to support the second windshield on the roll cage:
the first portion is disposed on a lower side of the front leg of the roll cage;
the second portion is disposed on the upper side of the front leg of the roll cage; and
part of the second windshield is supported by the second portion.

9. The connector of claim 8, wherein:
the second windshield has an inner sealing member; and
in use, the inner sealing member abuts an outer surface of the second portion.

10. The connector of claim 1, wherein:
the clamp comprises a first portion and a second portion fastened to the first portion; and
in use, the first portion and the second portion are configured to:
be disposed on opposite sides of the front leg of the roll cage to clamp the front leg of the roll cage therebetween;
hold part of the windshield between the first portion and the front leg of the roll cage; and
hold an end of the intrusion bar between the first and second portions.

11. The connector of claim 10, wherein each of the first portion and the second portion has a concave shape to at least partly wrap about part of the front leg of the roll cage.

12. The connector of claim 10, wherein each of the first portion and the second portion is generally C-shaped.

13. A windshield assembly for an off-road vehicle having a roll cage, the windshield assembly comprising:
a windshield;
an intrusion bar extending along part of the windshield; and
a clamp configured to be clamped to a front leg of the roll cage, the clamp connecting the windshield and the intrusion bar to the front leg of the roll cage.

14. The windshield assembly of claim 13, wherein:
the clamp has an upper portion and a lower portion opposite the upper portion;
the upper portion defines an internal recess;
the upper portion is disposed on an upper side of the front leg of the roll cage; and
part of the windshield is received in the recess and is held between the upper portion and the upper side of the front leg of the roll cage; and
an end of the intrusion bar is held between the upper and lower portions of the clamp.

15. The windshield assembly of claim 14, further comprising a fastener extending through the upper and lower portions of the clamp and the end of the intrusion bar to connect the intrusion bar to the clamp and to connect the upper and lower portions of the clamp to each other.

16. The windshield assembly of claim 15, wherein:
the windshield defines an aperture;
the upper portion of the clamp extends in the aperture of the windshield; and
a longitudinal axis of the fastener extends through the aperture of the windshield.

17. The windshield assembly of claim 15, wherein:
the fastener is a first fastener; and
the windshield assembly further comprises a second fastener extending through the upper and lower portions of the clamp to connect the upper and lower portions of the clamp to each other; and
a longitudinal axis of the second fastener does not extend through the windshield.

18. The windshield assembly of claim 17, wherein:
the clamp defines a passage between the upper and lower portions of the clamp to receive the front leg of the roll cage therein; and
the passage is disposed laterally between the first and second fasteners.

19. A method for installing an intrusion bar and a windshield on a roll cage of an off-road vehicle, the windshield being one of a first windshield and a second windshield, the method comprising:
for installing the first windshield and the intrusion bar:
placing a first portion of a clamp on an upper side of a front leg of the roll cage;
holding part of the first windshield between the first portion and the upper side of the front leg;
placing a second portion of the clamp on a lower side of the front leg;
fastening the first portion to the second portion to clamp the front leg and the part of the first windshield between the first and second portions; and
fastening the intrusion bar to the clamp;
for installing the second windshield and the intrusion bar:
placing the second portion of the clamp on the upper side of the front leg;
placing the first portion of the clamp on the lower side of the front leg;
fastening the first portion to the second portion to clamp the front leg between the first and second portions;
supporting part of the second windshield on the second portion of the clamp; and
fastening the intrusion bar to the clamp.

\* \* \* \* \*